(12) United States Patent
Curtis

(10) Patent No.: US 6,764,094 B1
(45) Date of Patent: Jul. 20, 2004

(54) WEIGHT SENSOR ASSEMBLY FOR DETERMINING SEAT OCCUPANT WEIGHT

(75) Inventor: Brian M. Curtis, Lake Orion, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 244 days.

(21) Appl. No.: 09/598,087

(22) Filed: Jun. 21, 2000

Related U.S. Application Data

(60) Provisional application No. 60/141,105, filed on Jun. 25, 1999.

(51) Int. Cl.[7] .......................... B60R 21/32; G01G 19/08
(52) U.S. Cl. ......................... 280/735; 180/273; 73/211; 73/853; 73/862.629
(58) Field of Search ........................ 280/735; 180/273; 297/217.2; 73/812, 849, 853, 856, 855, 862.474, 862.627, 862.634, 862.629; 177/136, 211, 144

(56) References Cited

U.S. PATENT DOCUMENTS

| | | |
|---|---|---|
| 2,708,005 A | 5/1955 | Gazzo |
| 3,022,976 A | 2/1962 | Zia |
| 3,766,344 A | 10/1973 | Nevett |
| 4,075,443 A | 2/1978 | Fatur |
| 4,181,012 A * | 1/1980 | Kiuchi .................. 73/862.634 |
| 4,558,757 A * | 12/1985 | Mori et al. ............... 178/18.05 |
| 5,232,243 A | 8/1993 | Blackburn et al. |
| 5,413,378 A | 5/1995 | Steffens, Jr. et al. |
| 5,474,327 A | 12/1995 | Schousek |
| 5,481,078 A | 1/1996 | Asche |
| 5,502,284 A | 3/1996 | Meiller et al. |
| 5,542,493 A | 8/1996 | Jacobson et al. |
| 5,570,903 A | 11/1996 | Meister et al. |
| 5,573,269 A | 11/1996 | Gentry et al. |
| 5,605,348 A | 2/1997 | Blackburn et al. |
| 5,612,876 A | 3/1997 | Zeidler et al. |
| 5,618,056 A | 4/1997 | Schoos et al. |
| 5,626,359 A | 5/1997 | Steffens, Jr. et al. |
| 5,670,853 A | 9/1997 | Bauer |
| 5,678,854 A | 10/1997 | Meister et al. |
| 5,732,375 A | 3/1998 | Cashler |
| 5,739,757 A | 4/1998 | Gioutsos |
| 5,804,887 A | 9/1998 | Holzapfel et al. |
| 5,810,392 A | 9/1998 | Gagnon |
| 5,822,707 A | 10/1998 | Breed |
| 5,942,695 A * | 8/1999 | Verma et al. .................. 73/768 |
| 5,971,432 A | 10/1999 | Gagnon et al. |
| 6,005,199 A * | 12/1999 | Harada et al. ............... 177/211 |
| 6,039,344 A | 3/2000 | Mehney et al. |
| 6,069,325 A | 5/2000 | Aoki |
| 6,070,115 A | 5/2000 | Oestreicher et al. |
| 6,092,838 A * | 7/2000 | Walker ........................ 280/735 |
| 6,161,891 A * | 12/2000 | Blakesley ................. 296/65.01 |

FOREIGN PATENT DOCUMENTS

| | | |
|---|---|---|
| DE | 38 09 074 C2 | 3/1992 |
| DE | 197 52 356 A1 | 5/1999 |
| DE | 199 31 379 A1 | 1/2001 |
| EP | 0 962 362 A2 | 12/1999 |
| EP | 0 990 565 A1 | 4/2000 |
| JP | 9 150662 | 6/1997 |
| WO | 0100454 | 4/2001 |

OTHER PUBLICATIONS

Research Disclosure—Jul. 1997, GB, Industrial Opportunities LTD. Havart, No. 399, p. 442 XP000726567, ISSN: 0374–4353, "Weight Sensing for Occupant Restraint Utilizing Load CEU Technologies".
PCT Written Opinion, dated Aug. 24, 2001.

* cited by examiner

Primary Examiner—David R. Dunn

(57) ABSTRACT

A system for measuring the weight of a seat occupant is used to control airbag deployment. The system includes a plurality of weight sensors that have a first end mounted to a seat riser and a second end mounted to a seat frame or track member. The weight sensors have a central bendable portion that extends between the first and second ends. A groove is formed in one of the external surfaces of the central bendable portion to localize strain. A full bridge strain gage assembly is mounted on a surface of each of the weight sensors, opposite from the groove, for generating a weight signal in response to measuring deflection of the central bendable portion. A central processor determines seat occupant weight based on the weight signals and an airbag control module communicates with the processor. The control module controls deployment force of the airbag based on seat occupant weight.

17 Claims, 4 Drawing Sheets

WEIGHT SENSOR ASSEMBLY FOR DETERMINING SEAT OCCUPANT WEIGHT

RELATED APPLICATION

This application claims priority to provisional application No. 60/141,105 filed on Jun. 25, 1999.

BACKGROUND OF THE INVENTION

1. Field of the Invention

This invention relates to an apparatus for measuring the weight of a seat occupant. Specifically, a sensor arrangement is mounted to a seat frame member to provide seat occupant weight measurements.

2. Related Art

Most vehicles include airbags and seatbelt restraint systems that work together to protect the driver and passengers from experiencing serious injuries due to a high speed collision. It is important to control the deployment force of the airbags and the force of the seatbelt pre-tensioners based on the size of the driver or the passenger. One way to control these forces is to monitor the weight of the seat occupant. If a smaller person such as a child or infant in a car seat is in the front passenger seat, the weight on the seat will be less than if an adult occupies the seat.

Current systems for measuring the weight of a seat occupant are complex and expensive. One type of system uses pressure sensitive foil mats mounted within the seat bottom foam. Another system uses sensors placed at a plurality of locations within the seat bottom cushion. The combined output from the mats or the sensors is used to determine the weight of the seat occupant. These sensors experience a substantially vertical force, due to the weight of the seat occupant, but are also subject to longitudinal and lateral forces caused by acceleration, deceleration, or turning. The lateral and longitudinal forces picked up by the sensor incorporate an error component into the weight measurement. The sensors are very sophisticated using multiple strain gages and complicated bending elements to provide high measurement sensitivity in the vertical direction and low sensitivity to lateral and longitudinal forces in order to increase accuracy.

Mounting these sensors within the seat bottom can also be difficult and time consuming. It is difficult to find mounting locations for each the sensors that will accommodate all of the various positions of a seated occupant while still providing accurate measurements. Further, shifting of the occupant on the seat can dislodge or move the sensors out of their proper location. Because the sensors are mounted within the seat bottom, it is difficult to reposition the sensors after the seat is installed in the vehicle.

Thus, it is desirable to have a simplified seat occupant weight measurement system that is a acurate and easily to install and overcomes the above references deficiencies with prior art systems.

SUMMARY OF THE INVENTION

In a disclosed embodiment of this invention, a system for measuring the weight of an occupant seated on a vehicle seat includes a seat element mounted to a vehicle structure and a seat support member for supporting a seat bottom. A plurality of weight sensor assemblies are mounted between the seat element and the seat support member. Each of the weight sensor assemblies has a bottom surface and a top surface with a full bridge strain gage mounted on one of the surfaces.

In a preferred embodiment, each weight sensor assembly has a first end mounted to the seat element, such as a seat riser, and a second end mounted to the seat support member, such as a seat frame or track member, with a central bendable portion extending between the first and second ends. The strain gages each generate a weight signal in response to measuring deflection of the central bendable portion for the respective sensor assembly. A central processor determines the seat occupant weight based on the weight signals. An airbag control module communicates with the processor to control deployment force of an airbag based on seat occupant weight.

In a further preferred embodiment, each of the sensors includes at least one groove formed in one of the top or bottom surfaces. The groove extends at least partially along the width of the sensor to localize strain in the central bendable portion. The strain gage is placed on the other of the top or bottom surfaces, facing opposite from the groove.

The subject invention provides a simplified seat occupant weight measurement system that is inexpensive, accurate, and easily to install. These and other features of the present invention can be best understood from the following specification and drawings, the following of which is a brief description.

DETAILED DESCRIPTION OF AN EXEMPLARY EMBODIMENT

Figure 1:
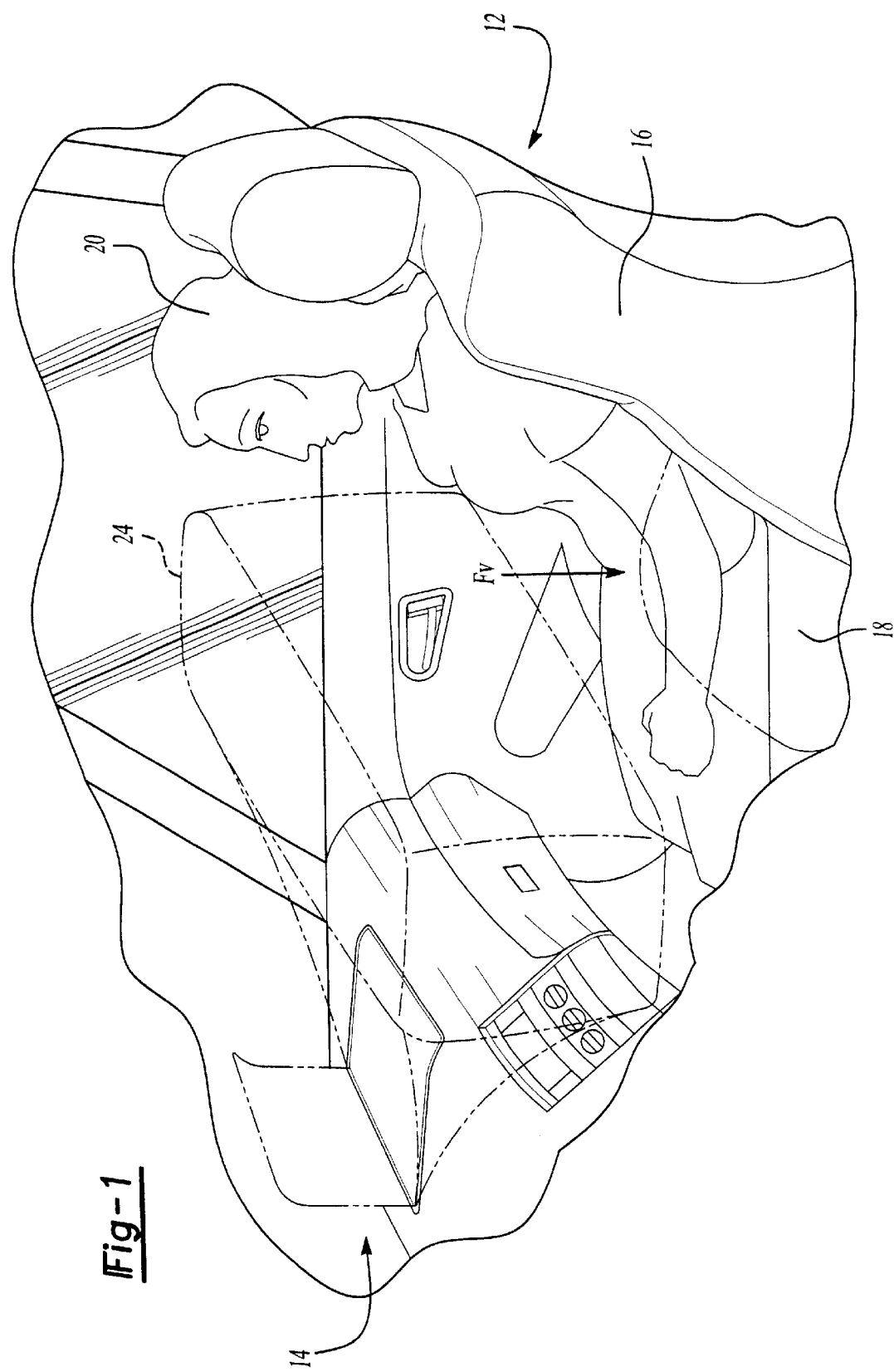
FIG. 1 is an environmental view of a seat occupant seated in a vehicle having an airbag system.

A vehicle includes a vehicle seat assembly, shown generally at 12 in FIG. 1, and an airbag system 14. The seat assembly 12 can be either a driver or passenger seat and includes a seat back 16 and a seat bottom 18. When a vehicle occupant 20 is seated on the seat 12 a vertical force Fv is exerted against the seat bottom 18. The vertical force Fv represents the weight of the seat occupant 20.

Figure 2:
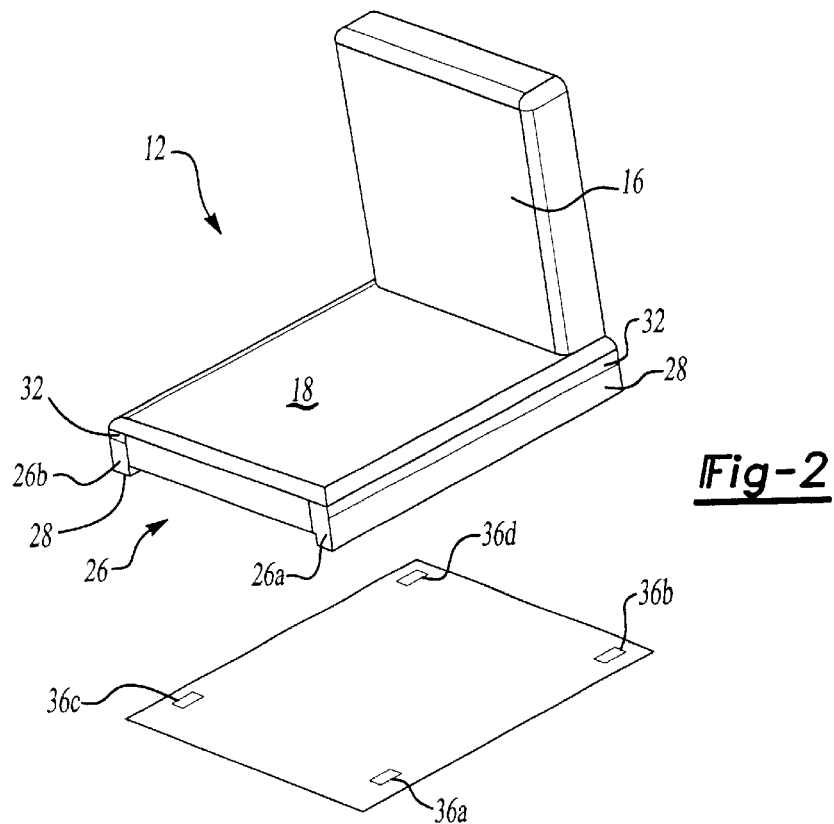
FIG. 2 is an exploded view of a seat assembly incorporating the subject weight measurement system.

The airbag system 14 deploys an airbag 24 under certain collision conditions. The deployment force for the airbag 24, shown in dashed lines in FIG. 1, varies according to the weight of the occupant 20. The vehicle includes a unique system for measuring the weight of the seat occupant 20. This unique system is integrated into a seat frame or track member, generally indicated at 26 in FIG. 2.

The seat 12 is preferably mounted to a vehicle structure 30 on an inboard track assembly 26a and an outboard track assembly 26b that is spaced apart from the inboard track assembly 26*a* by a predetermined distance. Both the inboard 26*a* and outboard 26*b* track assemblies include first 28 and second 32 track members. The first track member 28 is typically mounted to a seat riser 34 or directly to the vehicle structure 30, such as a floor. The second track member 32 is mounted for sliding movement relative to the first track member 28 so that seat 12 position can be adjusted forwardly and rearwardly within the vehicle to a desired position.

A plurality of sensor assemblies 36 are mounted between the first track members 28 of the inboard 26*a* and outboard 26*b* track assemblies and the riser 34. In the preferred embodiment, four (4) sensor assemblies 36 are used with a first sensor assembly 36*a* positioned near the front of the inboard track assembly 26*a*, a second sensor assembly 36*b* positioned near the rear of the inboard track assembly 26*a*, a third sensor assembly 36*c* positioned near the front of the outboard track assembly 26*b*, and a fourth sensor assembly 36*d* positioned near the rear of the outboard track assembly 26*b*.

Figure 3:
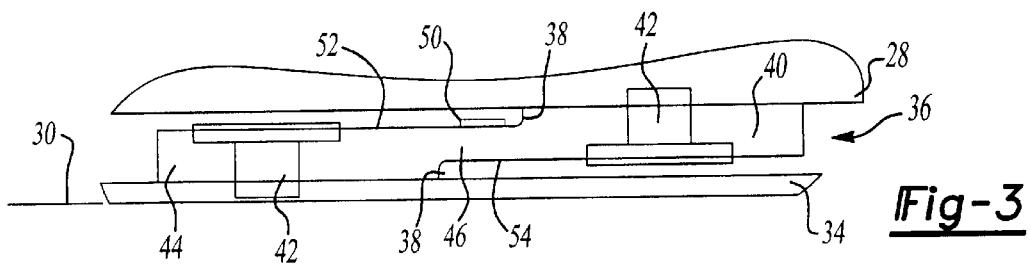
FIG. 3 is a side view, partially cut-away, of the seat of FIG. 2 showing the mounting of one sensor assembly.

Preferably, each sensor assembly 36*a*, 36*b*, 36*c*, and 36*d* has a first end 40 mounted to the first track member 28 with at least one fastener 42 and a second end 44 mounted to the riser 34 with at least one fastener 42, as shown in FIG. 3. It should be understood that any type of fastener can be used and that other joining methods known in the art can also be used to mount the sensors 36. A central bendable portion 46 extends between the first 40 and second 44 ends of the sensor assembly 36. As the vertical force Fv of the seat occupant 20 is exerted on the seat bottom 18, the central bendable portion 46 of each sensor assembly 36*a*, 36*b*, 36*c*, 36*d* deflects or bends into an S-shaped configuration putting one portion of the sensor 36 in compression and another portion in tension.

Figure 4:
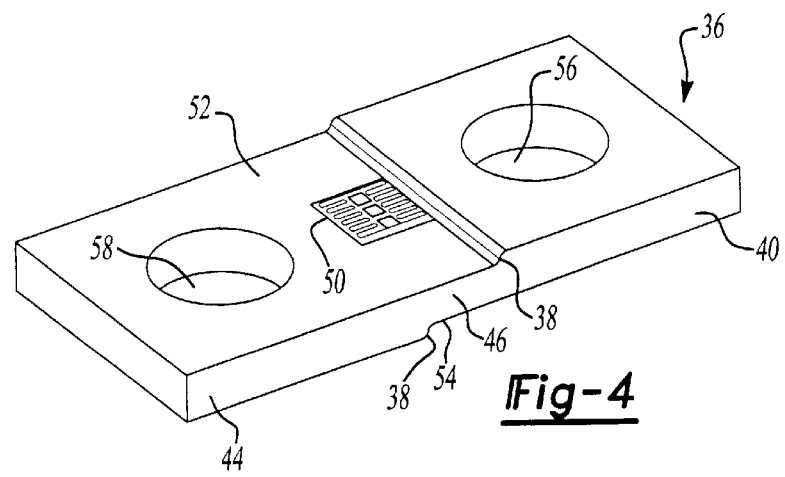
FIG. 4 is a perspective view of the sensor assembly of FIG. 3.

In the embodiment of FIGS. 3 and 4, the first 40 and second 44 ends are raised above/below the central bendable portion 46 to form steps 38 on each side of the central bendable portion 46. The height of the steps 38 can be varied. This configuration forms gaps between the sensor 36 and the track member 28 and between the sensor 36 and the riser 34 to facilitate bending.

A strain gage 50 is mounted to each of the sensors 36*a*, 36*b*, 36*c*, 36*d* to measure the amount of bending in the central portion 46. The sensors 36 have a top surface 52 facing the seat bottom 18 and a bottom surface 54 facing the riser 34. Preferably, a combination of four (4) strain gages, forming a full bridge, are mounted on one of the top 52 or bottom 54 surfaces to measure the bending. The four strain gages are thus combined to serve as a Wheatstone Bridge for measuring deflection. The operation of a Wheatstone Bridge is well known in the art.

As shown in FIG. 4, the stain gage 50 is mounted on the top surface 52 of the sensor 36. A first aperture 56 is formed at the first end 40 of the sensor 36 and a second aperture 58 is formed at the second end 44 of the sensor 36 for receiving the fasteners 42. The strain gage 50 is positioned between the apertures 56, 58 on the top surface 52. In order to achieve more accurate readings, full-bridge strain gage 50 should have all strain gage components mounted on only one surface of the sensor 36. In other words, if the strain gage 50 is mounted on the top surface 52 then no strain gage components should be mounted on the bottom surface 54 or if the gage 50 is mounted on the bottom surface 54 then no strain gage components should be mounted on the top surface 52.

Figure 5:
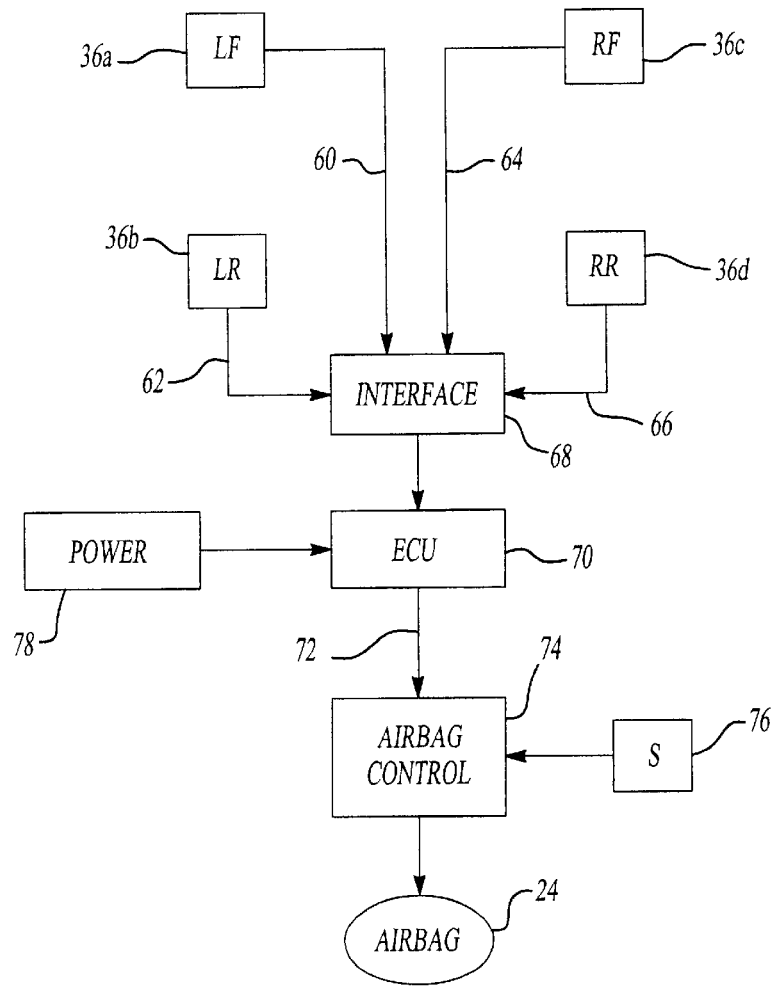
FIG. 5 is a schematic diagram of the control system incorporating the subject weight measurement system.

The sensors 36*a*, 36*b*, 36*c*, 36*d* each generate a signal representative of the occupant weight that causes bending at the respective location of the sensors 36*a*, 36*b*, 36*c*, 36*d*, see FIG. 5. Thus, the first sensor 36*a* generates a first signal 60, the second sensor 36*b* generates a second signal 62, the third sensor 36*c* generates a third signal 64, and the fourth sensor 36*d* generates a fourth signal 66. The signals 60, 62, 64, 66 are transmitted to a common interface unit 68 and are then fed into a central processor unit or electronic control unit (ECU) 70 as is known in the art. The ECU 70 combines the signals 60, 62, 64, 66 to determine the weight of the occupant 20. The ECU 70 then sends a control signal 72 a system controller 74. Preferably, the system controller 74 is an airbag control module that is in communication with the ECU 70 such that the deployment force of the airbag 24 is controlled based on seat occupant weight. The system controller 70 could also be used to control the force of seat belt pretensioners based on occupant weight. A vehicle crash sensor 76 also supplies information to the airbag control module 74 that is used in preparation for the control instructions for the airbag 24. The system utilizes a power supply 78 as is known in the art.

Figures 6A, 6B:
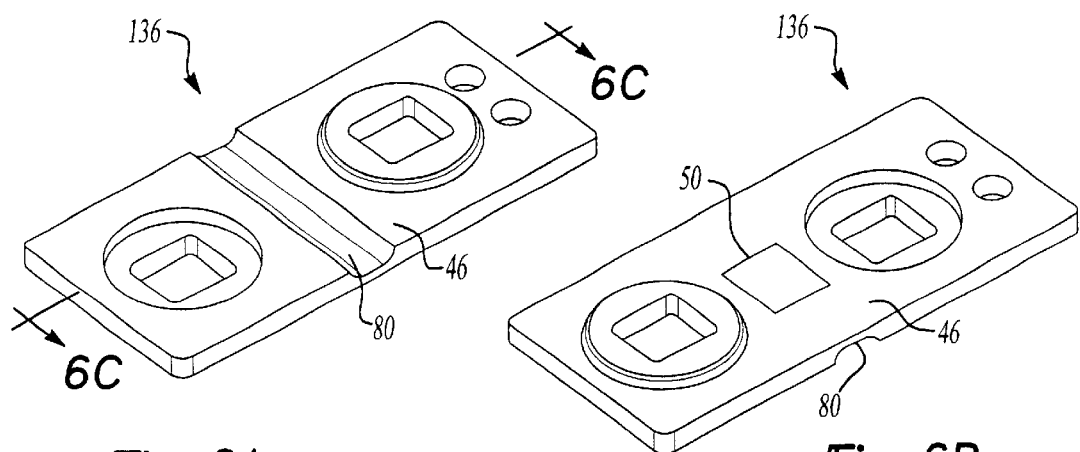
FIG. 6A is a top perspective view of a preferred embodiment of a sensor assembly.
FIG. 6B is a bottom perspective view of the sensor assembly of FIG. 6A.
Figure 6C:
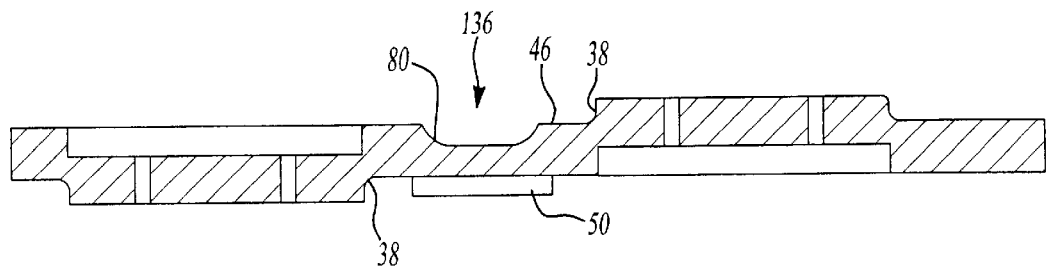
FIG. 6C is a cross-section view of the sensor assembly taken along 6C—6C of FIG. 6A.

A preferred embodiment of a weight sensor 136 is shown in FIGS. 6A–6C. In this preferred embodiment each of the sensor assemblies 136*a*, 136*b*, 136*c*, 136*d* includes at least one groove 80 formed in one of the top 52 or bottom 54 surfaces of the sensor 36. The groove 80 extends at least partially along the width of the sensor assembly 36 to localize strain in the central bendable portion 46. The full bridge strain gage 50 is placed the opposing surface, facing an opposite direction from the groove 80, see FIG. 6B. In this embodiment, the groove 80 extends across the entire with of the sensor 36.

Figure 7:
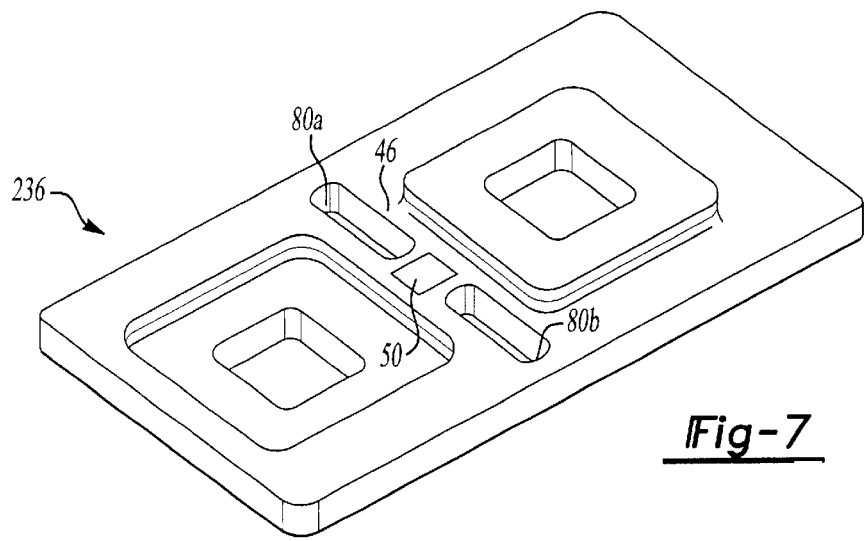
FIG. 7 is an alternate embodiment of a weight sensor.

In an alternate embodiment of a weight sensor 236, shown in FIG. 7, a pair of grooves 80*a*, 80*b* are formed in one of the top 52 or bottom 54 surfaces to localize strain in the central bendable portion 46. The grooves 80*a*, 80*b* are spaced apart from one another and only extend partially across the width of the sensor 36. In this embodiment, the strain gage 50 is mounted between the grooves 80*a*, 80*b*.

Figure 8:
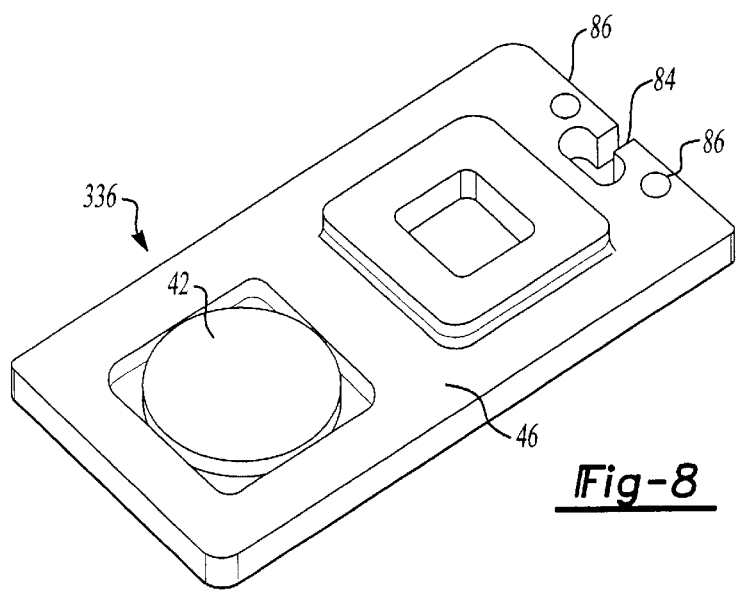
FIG. 8 is an alternate embodiment of a weight sensor.

In another alternate embodiment of a weight sensor 336, shown in FIG. 8, the sensor assembly 36 has a generally flat central bendable portion 46. A notch 84 is formed at one end that separates a pair of holes 86 that are used to connect the sensor 36 to the interface 68.

The subject invention offers a simplified system for measuring the weight of a seat occupant 20. It is preferable to integrate the sensors 36 between the track 28 and the riser 34 because they are common components for most vehicle seats 12. The subject weight measurement system is easily incorporated into any type of seat configuration. The measured weight is independent of seat position and is accurately provided in various occupant positions on the seat 12.

By measuring the deflection in all four (4) locations in the inboard 26*a* and outboard 26*b* track assemblies, it is possible to calculate the occupant weight, which is proportional to the sum of the output of all of the sensors 36*a*, 36*b*, 36*c*, 36*d*. The electronics for signal conditioning and the interface 68 can be housed within the track assemblies 26*a*, 26*b* as is well known in the art.

Although a preferred embodiment of this invention has been disclosed, it should be understood that a worker of ordinary skill in the art would recognize many modifications come within the scope of this invention. For that reason, the following claims should be studied to determine the true scope and content of this invention.

I claim:
1. A system for measuring a weight on a vehicle seat comprising:

a seat element mounted to a vehicle structure;

a seat support member for supporting a seat bottom; and a plurality of weight sensor assemblies mounted between said seat element and said seat support member, each of said weight sensor assemblies having a bottom surface and a top surface with a full bridge strain gage mounted on said bottom surface.

2. A system according to claim 1, wherein said seat element includes a seat riser that is mounted to a vehicle floor.

3. A system according to claim 2 wherein said seat support member is a seat track member fixed to said riser.

4. A system according to claim 3 wherein each of said sensor assemblies has a first end fixed to said eat track and a second end fixed to said riser with a central bendable portion extending between said first and second ends.

5. A system according to claim 4 wherein said full bridge strain gage is mounted on said central bendable portion.

6. A system for measuring a weight on a vehicle seat comprising:

a seat element mounted to a vehicle structure;

a seat support member for supporting a seat bottom; and a plurality of weight sensor assemblies mounted between said seat element and said seat support member, each of said weight sensor assemblies having a bottom surface and a top surface with a full bridge strain gage mounted on one of said top or bottom surfaces wherein each of said sensor assemblies includes a central bendable portion with at least one groove formed in one of said top or bottom surfaces and extending at least partially along the width of said sensor assembly to localize strain in said central bendable portion.

7. A system according to claim 6 wherein said full bridge strain gage is placed on the other of said top or bottom surfaces, facing opposite from said groove.

8. A system for measuring a weight on a vehicle seat comprising:

a seat element mounted to a vehicle structure;

a seat support member for supporting a seat bottom; and a plurality of weight sensor assemblies mounted between said seat element and said seat support member, each of said weight sensor assemblies having a bottom surface and a top surface with a full bridge strain gage mounted on one of said top or bottom surfaces wherein each of said sensor assemblies generates a weight signal representing a portion of the weight of an occupant that is transmitted to a central processing unit to determine seat occupant weight.

9. A system according to claim 8 including an airbag control module in communication with said processor wherein deployment force of an airbag is controlled by said control module based on seat occupant weight.

10. A system for measuring the weight of an occupant seated on a vehicle seat comprising:

a seat riser mounted to a vehicle structure;

a seat frame member for supporting a seat bottom;

a plurality of weight sensors each having a first end mounted to said seat riser and a second end mounted to said seat frame with a central bendable portion extending between said first and second ends wherein each of said sensors includes at least one groove formed in one of said top or bottom surfaces and extending at least partially along the width of said sensor to localize strain in said central bendable portion;

a strain gage assembly mounted only on either a top or bottom surface of each of said weight sensors for generating a weight signal in response to measuring deflection of said central bendable portion;

a central processor for determining seat occupant weight based on said weight signals; and an airbag control module in communication with said processor wherein deployment force of an airbag is controlled by said control module based on seat occupant weight.

11. A system according to claim 10 wherein said strain gage assembly is placed on the other of said top or bottom surfaces, facing opposite from said groove.

12. A system according to claim 11 wherein said each of said strain gage assemblies is a full bridge gage.

13. A system according to claim 12 wherein each of said full bridge gages are mounted on said bottom surfaces of said sensors.

14. A system for measuring the weight of an occupant seated on a vehicle seat comprising:

a seat bottom;

an inboard track assembly and an outboard track assembly space apart from each other and mounted to the vehicle structure, said inboard and outboard track assemblies each having a first track mounted to a seat riser and a second track mounted for movement relative to said first track;

a first weight sensor positioned near a forward portion of said inboard track assembly;

a second weight sensor positioned near a rearward portion of said inboard track assembly;

a third weight sensor positioned near a forward portion of said outboard track assembly;

a fourth weight sensor positioned near a rearward portion of said outboard track assembly;

each of said weight sensors having a first end fixed to said first track and a second end fixed to said riser with a central bendable portion extending between said first and second ends;

at least one groove formed in one of a top or bottom surface of each of said sensors and extending at least partially along the width of said sensor to localize strain in said central bendable portion;

a full bridge strain gage assembly mounted on the other of said top or bottom surfaces of each of said sensors, facing away from said groove, said gage assemblies each generating a weight signal in response to measuring deflection of said central bendable portion of said respective sensor;

a central processor for determining seat occupant weight based on said weight signals; and an airbag control module in communication with said processor wherein deployment force of an airbag is controlled by said control module based on seat occupant weight.

15. A system for measuring a weight on a vehicle seat comprising:

a seat element mounted to a vehicle structure;

a seat support member for supporting a seat bottom; and a plurality of weight sensor assemblies mounted between said seat element and said seat support member, each of said weight sensor assemblies having a bottom surface and a top surface with a full bridge strain gage mounted on one of said top or bottom surfaces wherein said plurality of weight sensor assemblies comprises a first set of weight sensor assemblies mounted on one side of the seat bottom and a second set of weight sensor assemblies mounted on an opposite side of the seat bottom.

16. A system according to claim 15 wherein said first set of weight sensor assemblies comprises a first pair of weight sensor assemblies with one weight sensor assembly positioned near a front portion of the seat bottom and another weight sensor assembly positioned near a rear portion of the seat bottom and wherein said second set of weight sensor assemblies comprises a second pair of weight sensor assemblies with one weight sensor assembly positioned near the front portion of the seat bottom and another weight sensor assembly positioned near the rear portion of the seat bottom.

17. A system for measuring the weight of an occupant seated on a vehicle seat comprising:

a seat riser mounted to a vehicle structure;

a seat frame member for supporting a seat bottom;

a plurality of weight sensors each having a first end mounted to said seat riser and a second end mounted to said seat frame with a central bendable portion extending between said first and second ends wherein said plurality of weight sensor assemblies comprises a first set of multiple weight sensor assemblies mounted on one side of the seat bottom and a second set of multiple weight sensor assemblies mounted on an opposite side of the seat bottom;

a strain gage assembly mounted only on either a top or bottom surface of each of said weight sensors for generating a weight signal in response to measuring deflection of said central bendable portion;

a central processor for determining seat occupant weight based on said weight signals; and an airbag control module in communication with said processor wherein deployment force of an airbag is controlled by said control module based on seat occupant weight.

* * * * *